United States Patent
Kogure et al.

(10) Patent No.: US 7,316,251 B2
(45) Date of Patent: Jan. 8, 2008

(54) TIRE BREAKDOWN WARNING DEVICE AND PNEUMATIC TIRE

(75) Inventors: Tomohiko Kogure, Hiratsuka (JP); Akira Kuramori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 383 days.

(21) Appl. No.: 10/920,345

(22) Filed: Aug. 18, 2004

(65) Prior Publication Data

US 2005/0045257 A1    Mar. 3, 2005

(30) Foreign Application Priority Data

Aug. 26, 2003  (JP)  ............... 2003-301145

(51) Int. Cl.
  *B60C 23/00*  (2006.01)
  *B60C 23/20*  (2006.01)
  *G01M 17/02* (2006.01)

(52) U.S. Cl. ..................... 152/152.1; 73/146

(58) Field of Classification Search .................. None
See application file for complete search history.

(56) References Cited

U.S. PATENT DOCUMENTS 5,500,065 A * 3/1996 Koch et al. ................ 156/123
6,921,197 B2 * 7/2005 Aubel et al. ............... 374/141

FOREIGN PATENT DOCUMENTS

| EP | 1279526 | * | 1/2003 |
| JP | 63-189703 U1 | | 12/1988 |
| JP | 03-262716 A1 | | 11/1991 |

* cited by examiner

*Primary Examiner*—Justin R. Fischer
(74) *Attorney, Agent, or Firm*—Greer, Burns & Crain, Ltd.

(57) ABSTRACT

A tire breakdown warning device includes at least one temperature sensor for detection of temperature of a pneumatic tire, and provides a warning when a breakdown of the tire is found on the basis of detection signals detected by the at least one temperature sensor. The at least one temperature sensor is embedded in the vicinity of at least one end of at least one tire constituent component which is placed in the pneumatic tire and which is vulnerable to break down.

8 Claims, 2 Drawing Sheets

TIRE BREAKDOWN WARNING DEVICE AND PNEUMATIC TIRE

BACKGROUND OF THE INVENTION

The present invention relates to tire breakdown warning devices which detect a breakdown of a pneumatic tire to impart a warning and pneumatic tires having a temperature sensor thereof, and more particularly, to a tire breakdown warning device and a pneumatic tire in which detection accuracy of tire breakdown can be improved.

If traveling of a vehicle is kept without awareness of occurrence of tire breakdown during traveling, there is a risk that a serious traffic accident will be developed by burst of the tire. In particular, when traveling at high speed on an expressway or the like, a disastrous traffic accident will happen. Therefore, when tire breakdown occurs, it is very important to find it immediately.

Disclosed in Unexamined Japanese Patent Publication No. 3-262716 and Unexamined Japanese Utility Model Publication No. 63-189703 are conventional tire breakdown detection devices which use a temperature sensor, in which the temperature sensor detects temperature of a surface or cavity of a tire and tire breakdown is determined by change of the temperatures. Occurrence of breakdown of a pneumatic tire significantly increases heat generated at a breakdown spot, and it is, therefore, very effective to find tire breakdown using the temperature sensor.

However, breakdown of a pneumatic tire generally occurs at an end of a tire constituent component such as a belt ply or carcass ply embedded in the tire, or inside of the tire in a shoulder area of a tread or the like having a thick rubber layer portion when an excessive load is applied thereto. The conventional devices described above do not directly detect temperature inside the tire where breakdown occurs. Therefore, there is a problem of detection accuracy such that there is a delay in the detection of tire breakdown, and there is still room for improvement.

SUMMARY OF THE INVENTION

An object of the present invention is to provide a tire breakdown warning device and a pneumatic tire in which tire breakdown detection accuracy can be improved.

In order to achieve the above object, the present invention provides a tire breakdown warning device which provides a warning when a breakdown of a pneumatic tire is found on the basis of detection signals detected by at least one temperature sensor for detection of temperature of the pneumatic tire, wherein the at least one temperature sensor is embedded in the vicinity of at least one end of at least one tire constituent component which is placed in the pneumatic tire and which is vulnerable to break down.

A pneumatic tire according to the present invention includes at least one temperature sensor, for detection of temperature of the pneumatic tire, of a tire breakdown warning device which provides a warning when a breakdown of the tire is found on the basis of detection signals detected by the at least one temperature sensor, wherein the at least one temperature sensor is embedded in the vicinity of at least one end of at least one tire constituent component which is placed in the pneumatic tire and which is vulnerable to break down.

In general, pneumatic tires are most vulnerable to break down at ends of a tire constituent component such as a belt ply or a carcass ply embedded therein because of the highest stress concentration thereon. If the tire breakdown occurs, an abnormal heat is created at the breakdown location because a ply separation occurs and friction is generated between the separated faces.

According to the present invention described above, the temperature sensor is embedded in the vicinity of the end of the tire constituent component which is placed inside the tire and which is vulnerable to break down, and temperature at the breakdown location is directly measured thereby. Therefore, a delay in the detection due to conventional indirect measurement is improved, and tire breakdown detection accuracy can be enhanced.

DETAILED DESCRIPTION OF THE PREFERRED EMBODIMENTS

The embodiments of the present invention will be described in detail below with reference to the drawings.

Figure 1:
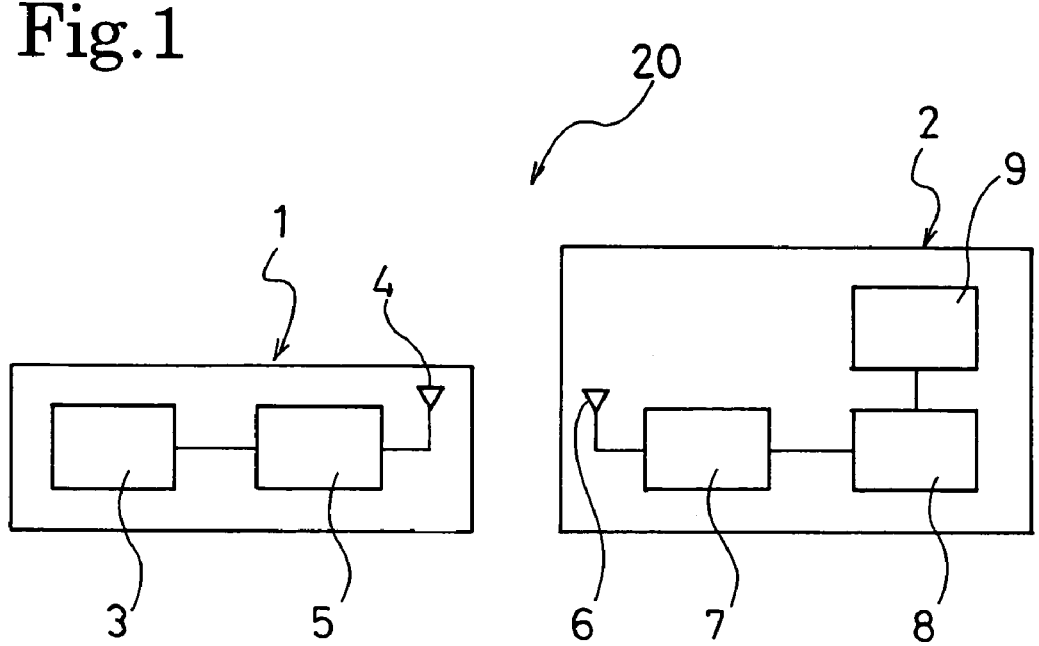
FIG. 1 is a view for illustrating a tire breakdown warning device according to the present invention.

Referring to FIG. 1, reference numeral 20 denotes a tire breakdown warning device according to the present invention, and this tire breakdown warning device 20 comprises a tire mount unit 1 to be mounted in a pneumatic tire and a vehicle mount unit 2 to be mounted on a vehicle.

The tire mount unit 1 includes a temperature sensor 3 for detecting temperature of the pneumatic tire, and a transmitting section 5 for transmitting detection signals of the temperature sensor 3 through an antenna 4 to the vehicle mount unit 2. The transmitting section 5 is operated with a battery (not shown) and is arranged so as to send the detection signals of the temperature sensor 3 at a predetermined time interval (for example, at a one-minute interval). The temperature sensor 3 employed here may preferably include, for example, a thermocouple.

The vehicle mount unit 2 includes a receiving section 7 for receiving the detection signals from the transmitting section 5 through an antenna 6, a processing section 8 for processing the detection signals input from the receiving section 7, and a warning section 9 for providing a warning to the driver when the processing section 8 determines that tire breakdown occurs.

The processing section 8 calculates temperature values on the basis of the input detection signals, and compares the calculated temperature values with two preset threshold values. One of them is a breakdown temperature threshold value, and the processing section 8 determines whether or not the calculated temperature values exceed the breakdown temperature threshold value. If the processing section 8 is determined that the calculated temperature value exceeds the breakdown temperature threshold value, the processing section 8 outputs a warning signal to the warning section 9. When the warning signal is input to the warning section 9, the warning section 9 provides a warning to the driver, for example, by turning on a red lamp or by giving a warning sound. The driver stops the vehicle immediately after warning, whereby the tire can be prevented from bursting.

The other threshold value is a precautionary temperature threshold value for informing that a tire temperature is close to a breakdown temperature. The processing section 8 determines whether or not the calculated temperature values exceed the precautionary temperature threshold value, and if processing section 8 is determined that the calculated temperature value exceeds the precautionary temperature threshold value, the processing section 8 outputs a precautionary signal to the warning section 9 because of being in a state of an excessive load where there is a risk that tire breakdown will occur. When the precautionary signal is input to the warning section 9, the warning section 9 provides a precautionary warning to the driver, for example, by turning on a yellow lamp or by giving a precautionary warning sound other than the above warning sound. The driver lowers a traveling speed of the vehicle after precautionary warning, whereby occurrence of tire breakdown can be avoided.

A tire also breaks down when the temperature thereof increases drastically. The processing section 8 further calculates a value of each temperature rise amount in a unit of time (for example, in a unit of one minute) at each temperature detected on the basis of the calculated temperature values, and compares the calculated temperature rise amount value with two preset threshold values corresponding to each temperature. One of them is a threshold value of the amount of breakdown temperature rise in a unit of time, and the processing section 8 determines whether or not the calculated temperature rise amount value exceeds the breakdown temperature rise amount threshold value. If the processing section 8 is determined that the calculated temperature rise amount value exceeds the breakdown temperature rise amount threshold value, the processing section 8 outputs a warning signal to the warning section 9. When the warning signal is input to the warning section 9, the warning section 9 provides a warning to the driver, as described above, by turning on a red lamp, by giving a warning sound or the like.

The other threshold value is a threshold value of the amount of precautionary temperature rise in a unit of time for informing that a tire temperature is close to a breakdown temperature. The processing section 8 determines whether or not the calculated temperature rise amount value exceeds the precautionary temperature rise amount threshold value, and if the processing section 8 is determined that the calculated temperature rise amount value exceeds the precautionary temperature rise amount threshold value, the processing section 8 outputs a precautionary signal to the warning section 9 because of being in a state of an excessive load where there is a risk that tire breakdown will occur. When the precautionary signal is input to the warning section 9, the warning section 9 provides a precautionary warning to the driver, as described above, by turning on a yellow lamp, by giving a precautionary warning sound other than the above warning sound or the like.

Figure 2:
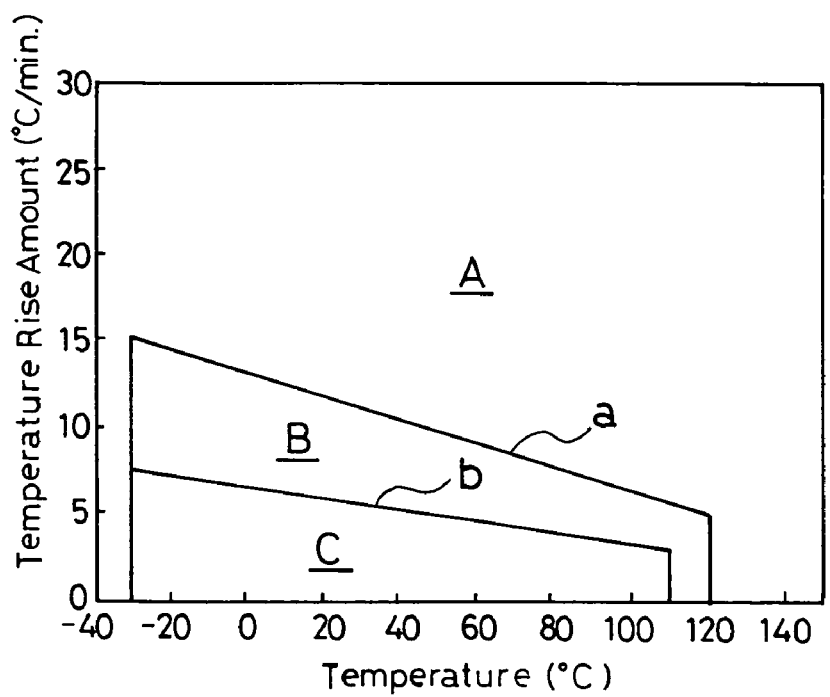
FIG. 2 is a graph showing a relationship between temperatures and breakdown of a heavy duty pneumatic tire.

The functions of the processing section 8 will be described below in more detail with reference to the graph of FIG. 2. The graph of FIG. 2 shows a relationship between temperatures and breakdown of a heavy duty pneumatic tire which is used for a vehicle such as a truck, in which reference character A denotes a breakdown zone, reference character B denotes a breakdown precaution zone, and reference character C denotes a normal zone.

In the case of such a heavy duty pneumatic tire, the threshold value of temperature of tire breakdown caused by heat generation is set to 120° C., and the precautionary temperature threshold value is set to 110° C. When the value of a temperature detected by the temperature sensor 3 exceeds 110° C. and is in the breakdown precaution zone B, the processing section 8 outputs a precautionary signal to the warning section 9. The warning section 9 provides a precautionary warning to inform the driver that the tire is in a state of an excessive load where there is a risk that tire breakdown will occur. When the value of a temperature detected by the temperature sensor 3 exceeds 120° C. and is in the breakdown zone A, the processing section 8 outputs a warning signal to the warning section 9. The warning section 9 provides a warning to inform the driver that tire breakdown occurs.

The threshold values of the amounts of breakdown temperature rises in a unit of time at respective temperatures are set as an expression showing a straight line a, and the threshold values of the amount of precautionary temperature rises in a unit of time at respective temperatures are set as an expression showing a straight line b. If the calculated value of the amount of temperature rise in a unit of time immediately preceding each temperature detected by the temperature sensor 3 exceeds the line b and is in the breakdown precaution zone B, the processing section 8 outputs a precautionary signal to the warning section 9. If the calculated value of the amount of temperature rise in a unit of time immediately preceding each temperature detected by the temperature sensor 3 exceeds the line a and is in the breakdown zone A, the processing section 8 outputs a warning signal to the warning section 9.

Incidentally, the threshold values of the amount of breakdown temperature rise and the amount of precautionary temperature rise in a unit of time at a tire temperature of 50° C. are 6° C./min. and 12° C./min., respectively, and the threshold values of the amount of breakdown temperature rise and the amount of precautionary temperature rise in a unit of time at a tire temperature of 100° C. are 4° C./min. and 8° C./min., respectively.

The rubber used for the above heavy duty pneumatic tire does not function as rubber when the temperature thereof is below −30° C., and the tire breaks down. It is, therefore, preferable that a second threshold value (−30° C.) of breakdown temperature be set on the processing section 8 to make the processing unit 8 output a warning signal to the warning section 9 and to make the warning section 9 provide a warning if the value of a temperature detected by the temperature sensor 3 is lower than the second breakdown temperature threshold value.

The foregoing embodiment shows one example of the tire breakdown warning device 20 having one tire mount unit 1. The tire breakdown warning device 20 may, however, include a plurality of tire mount unit 1.

Figure 3:
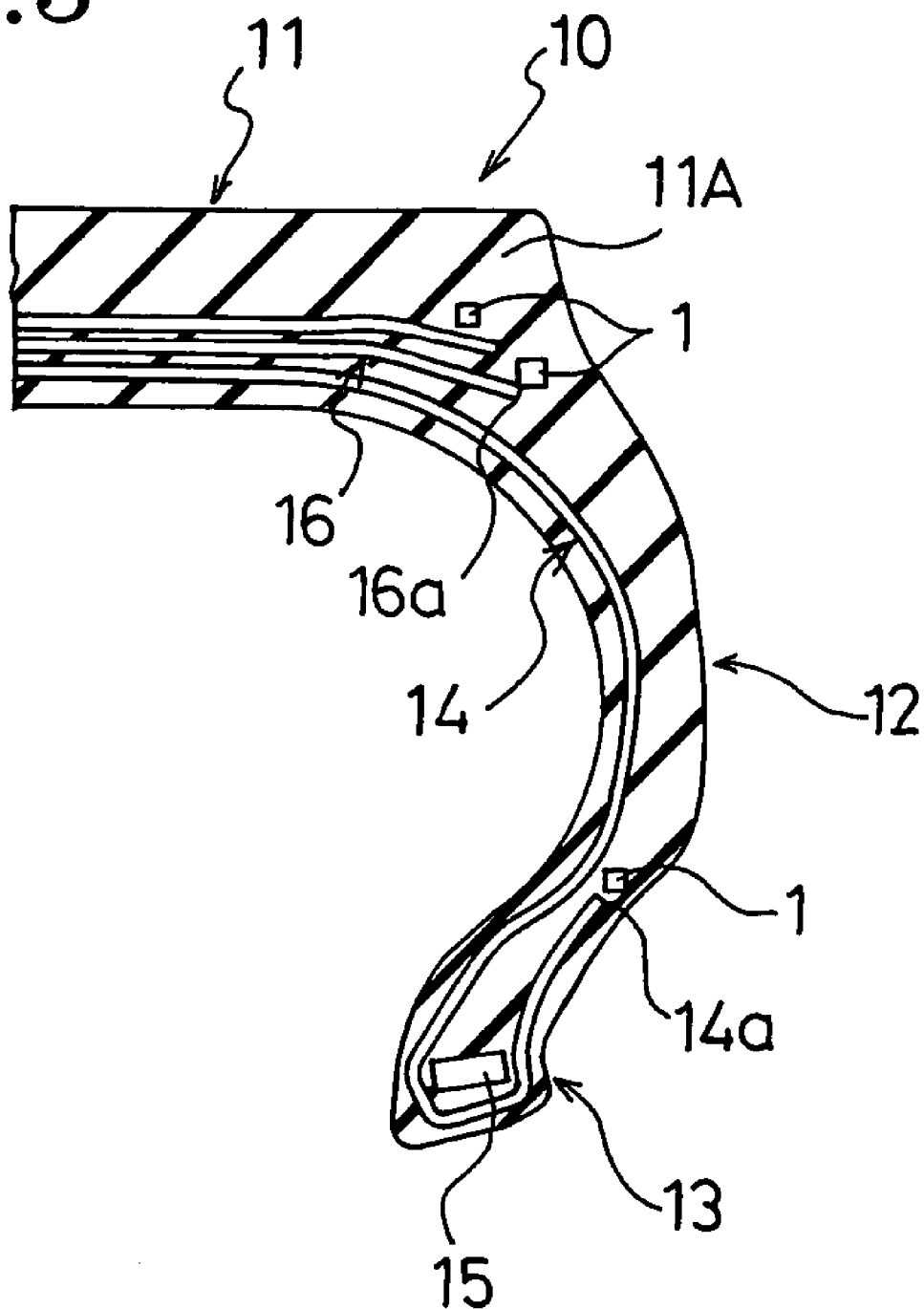
FIG. 3 is a partial cross-sectional view showing a pneumatic tire in which a tire mount unit in FIG. 1 is embedded at each location.

Referring to FIG. 3, there is shown an example of a pneumatic tire 10 having a plurality of tire mount units 1, in which reference numeral 11 denotes a tread, reference numeral 12 denotes a sidewall, and reference numeral 13 denotes a bead. Placed between the left and right beads 13 in the tire is a carcass ply (tire constituent component) 14 having tire-radially extending reinforcement cords which are arranged in a predetermined interval along a circumferential direction of the tire, and both each portion side thereof is turned up outward from the inner side of the tire around a bead core 15 embedded in the bead 13. Provided radially outwardly of the carcass ply 14 in the tread 11 are a plurality of belt plies (tire constituent components) 16 having reinforcement cords which are arranged in an inclined manner with respect to the tire circumferential direction.

The tire mount units 1 are each embedded in the vicinity of each end 16a of the belt ply 16 and in the vicinity of each end 14a of the carcass ply 14, and are further embedded in each shoulder area 11A of the tread 11 having a thick rubber portion, the ends 14a and 16b and the shoulder areas 11a being vulnerable to break down.

The pneumatic tire 10 exemplified in FIG. 3 shows a heavy duty pneumatic tire, and the rubber thickness in each shoulder area 11A of the tread 11 thereof is thick. The tire mount unit 1 is, therefore, placed therein since an excessive load is applied thereto by a high load. However, in the case of pneumatic tires used for passenger cars or the like to which an excessive load is not applied, the tire mount units 1 need not be embedded in the shoulder areas 11A of the tread 11, and may be embedded in the vicinity of ends of at least tire constituent components such as the carcass ply 14 and belt ply 16

In the case of pneumatic tires having a construction such that it is obvious that either the ends 16a of the belt ply 16 or the ends 14a of the carcass ply 14 break down earlier, it is not necessary to provide the tire mount units relative to both ends 14a and 16a, and the tire mount units 1 maybe embedded in the vicinity of either of the ends which break down earlier.

According to the present invention described above, the temperature sensors 3 are embedded in the vicinity of the ends of such tire constituent components as the carcass ply 14 and the belt ply 16 and in the shoulder areas 11A of the tread 11 which have a thick rubber portion, and temperatures of breakdown spots are directly measured thereby. Therefore, a problem does not arise such as a delay in the detection of tire breakdown, and detection accuracy of tire breakdown can be improved. Accordingly, tire breakdown can be promptly found to thereby prevent tire burst, thus allowing traveling safety to be enhanced.

A warning can be provided to the driver before tire breakdown occurs, and occurrence of tire breakdown is, therefore, prevented, thus allowing for greater enhancement of traveling safety.

In the present invention, a temperature sensor for detecting an ambient temperature or a road surface temperature may be provided to adjust the above threshold values on the basis of a temperature detected by the temperature sensor. Tire breakdown temperature is affected by the ambient temperature or road surface temperature in any way. The adjustment of the threshold values using the temperature sensor provided outside a vehicle allows for further enhancement of detection accuracy of tire breakdown.

In the alternative of the above-mentioned battery, the power source operating the transmitting section 5 may be arranged such that high-frequency signals are periodically sent from the vehicle mount unit 2 side to the tire mount unit 1 side and the tire mount unit 1 side transforms the high-frequency signals into electric power to operate the transmitting section 5 and to transmit the detection signals from the transmitting section 5 to the receiving unit 7.

The preferred embodiments of the present invention have been described above. However, the present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A tire breakdown warning device which provides a warning when a breakdown of a pneumatic tire is found on the basis of detection signals detected by at least one temperature sensor for detection of temperature of the pneumatic tire, the tire breakdown warning device comprising:

a vehicle mount unit having a processing section for processing the detection signals from the at least one temperature sensor and a warning section for providing a warning of the tire breakdown, the processing section calculating a value of temperature of each detection signals input thereto and determining whether or not the calculated temperature value exceeds a preset threshold value of breakdown temperature, the warning section providing a warning when the processing section determines that the calculated temperature value exceeds the preset threshold value of breakdown temperature, wherein the processing section calculates each value of the amount of temperature rise in a unit of time at each temperature detected, and determines whether or not the calculated temperature rise amount value exceeds a preset threshold value of the amount of breakdown temperature rise corresponding to each temperature, the warning section providing a warning when the processing section determines that the calculated temperature rise amount value exceeds the preset threshold value of the amount of breakdown temperature rise, and wherein the at least one temperature sensor is embedded in the vicinity of at least one end of at least one tire constituent component which is placed in the pneumatic tire and which is vulnerable to break down.

2. A tire breakdown warning device according to claim 1, wherein the processing section determines whether or not the calculated temperature value exceeds a preset threshold value of precautionary temperature for informing that the calculated temperature value is close to a breakdown temperature, the warning section providing a precautionary warning when the processing section determines that the calculated temperature value exceeds the preset threshold value of precautionary temperature.

3. A tire breakdown warning device according to claim 1, wherein the processing section determines whether or not the calculated temperature rise amount value exceeds a preset threshold value of the amount of precautionary temperature rise corresponding to each temperature for informing that the calculated temperature rise amount value is close to a breakdown temperature rise amount, the warning section providing a precautionary warning when the processing section determines that the calculated temperature rise amount value exceeds the preset threshold value of the amount of precautionary temperature rise.

4. A tire breakdown warning device according to claim 1, comprising at least one tire mount unit having the one temperature sensor and a transmitting section for transmitting the detection signals detected by the at least one temperature sensor, the vehicle mount unit having a receiving section for receiving the detection signals transmitted from the transmitting section, the at least one tire mount unit being embedded in the vicinity of at least one end of the at least one tire constituent component.

5. A tire breakdown warning device according to claim 1, wherein the at least one tire constituent component comprises a carcass ply or a belt ply.

6. A tire breakdown warning device according to claim 1, wherein the at least one tire constituent component comprises a carcass ply and a belt ply, and wherein the at least one temperature sensor comprises at least two temperature sensors.

7. A tire breakdown warning device according to claim 1, wherein the at least one temperature sensor comprises at least two temperature sensors, one of which is embedded in a thick rubber portion of the tire.

8. A tire breakdown warning device according to claim 7, wherein the thick rubber portion is in a shoulder area of a tread.

* * * * *